Sept. 26, 1950          J. JUNGWIRTH          2,523,954
ALL UNIVERSAL TANDEM REAR END FOR
TRUCKS, TRACTORS, AND TRAILERS Filed Feb. 12, 1947          2 Sheets-Sheet 1

INVENTOR.
BY John Jungwirth

Sept. 26, 1950 J. JUNGWIRTH 2,523,954
ALL UNIVERSAL TANDEM REAR END FOR
TRUCKS, TRACTORS, AND TRAILERS
Filed Feb. 12, 1947 2 Sheets-Sheet 2
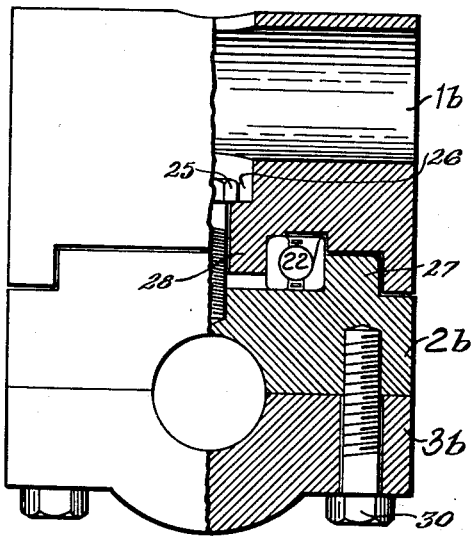
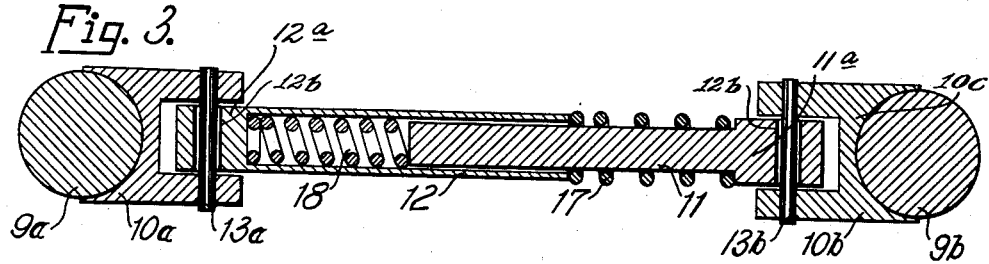
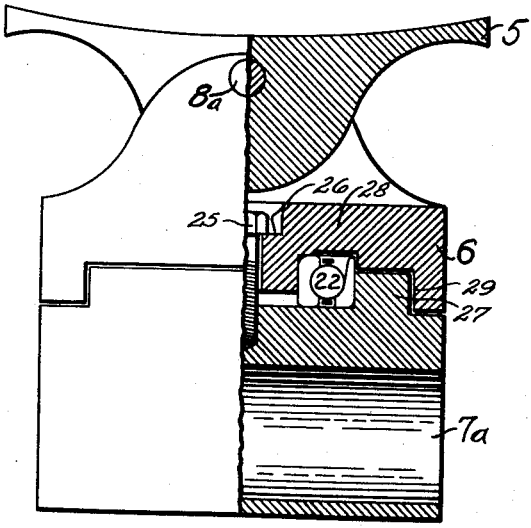
INVENTOR.
BY John Jungwirth Patented Sept. 26, 1950

2,523,954

UNITED STATES PATENT OFFICE 2,523,954

ALL UNIVERSAL TANDEM REAR END FOR TRUCKS, TRACTORS, AND TRAILERS

John Jungwirth, Chicago, Ill.

Application February 12, 1947, Serial No. 728,172

18 Claims. (Cl. 280—104.5)

My invention relates to improvements in tandem, rear-ends for trucks, tractors or trailers and particularly to an all universal tandem rear-end unit for trucks, tractors and trailers.

The principal objects of my invention are to provide a completely universal tandem rear-end unit which will allow the axles to move forward or backward as needed; to allow independent motion, in an upward or downward direction, of each wheel or set of wheels; and to allow the axles to have a common center of radius when turning or altering the course of chosen direction.

Another object is to construct the unit so that there are no delicate parts to get out of order and that no binding or twisting of parts will exist.

A further object of the invention is to produce a simple operating device as well as one which will be exceedingly effective for the purpose for which it is designed.

These objects I accomplish by means of a structure and relative arrangements of parts which will be understood from a perusal of the following specification and claims.

With the above objects in view, and any others which may suggest themselves from the description to follow, a better understanding of the invention may be had by reference to the accompanying drawings, in which:

Fig. 2 is an enlarged view taken from the line 2—2 of Fig. 1, partly in section and without the axle;

Fig. 3 is an enlarged section of a tie rod assembly, taken on the line 3—3 of Fig. 1, and Fig. 4 is an enlarged view in the direction of the line 4—4 of Fig. 1, partly in section.

Figure 1:
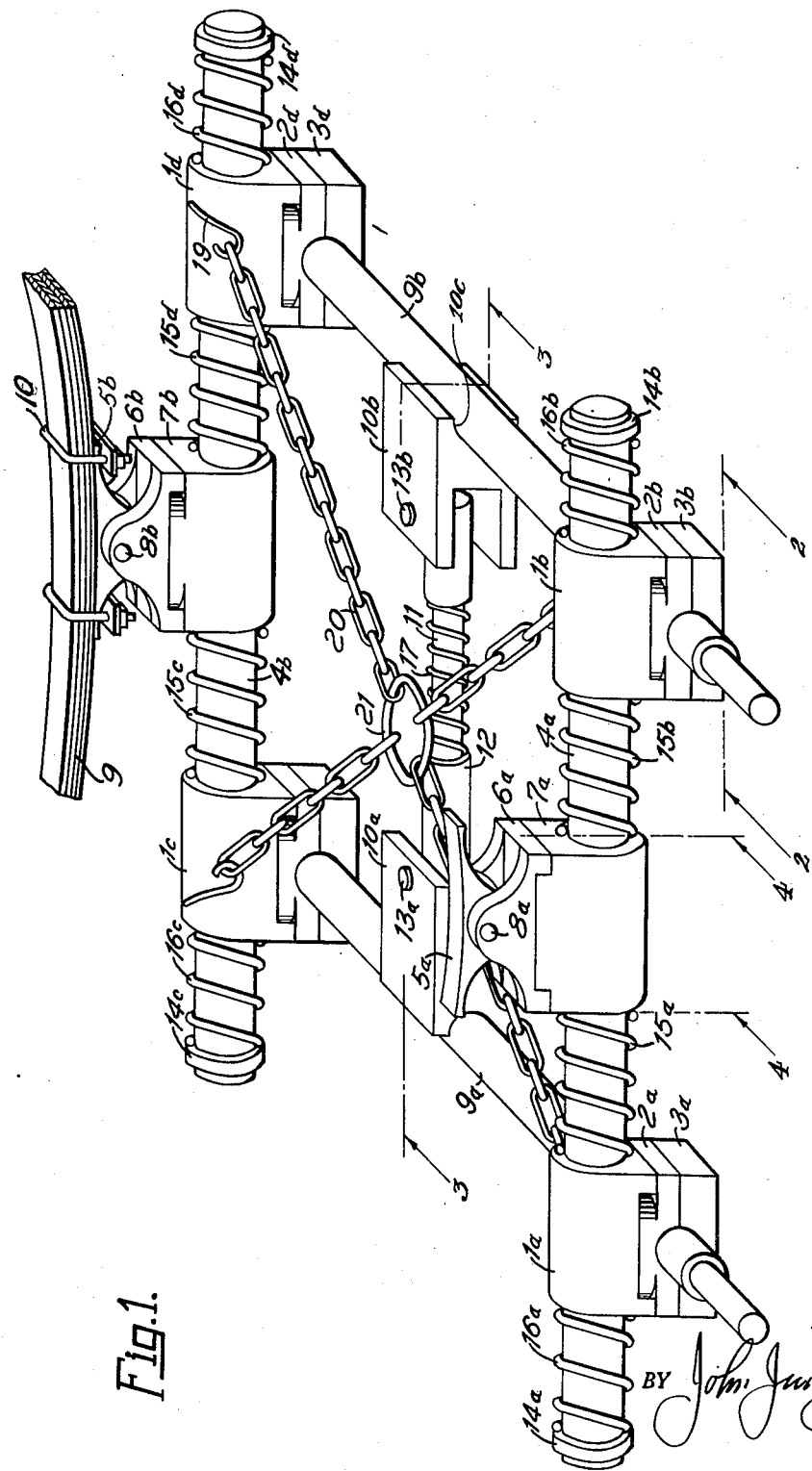
Fig. 1 is a perspective view of the novel unit at rest, or in the normal position.

Referring specifically to the drawings, 9a and 9b represent the tandem rear axles of the unit. In a general sense these are overlaid near the ends by a pair of longitudinal beams 4a and 4b, forming a rectangular frame. The latter receives corner bearings 1a, 1b, 1c and 1d, while the beams 4a and 4b carry medial bearings 7a and 7b presenting seats 5a and 5b for the leaf springs 9 depending from the body of the truck, tractor or trailer for which the novel tandem unit is designed.

As shown, the beams are of circular cross-section; and they are slidably disposed at one side of the unit in the bearings 1a, 7a and 1b, and at the other side thereof in the bearing, 1c, 7b and 1d. The beams are fitted with detachable end collars 14a, 14b, 14c and 14d, and mounted with a series of coil springs. Thus, the beam 4a receives a coil spring 16a between the collar 14a and the bearing 1a; a coil spring 15a between the bearing 1a and the bearing 7a; a coil spring 15b between the bearing 7a and the bearing 1b; and a coil spring 16b between the bearing 1b and the collar 14b. The beam 4b is likewise equipped with similar springs 16c, 15c, 15d and 16d. All the springs are mounted normally under compression.

The spring seats 5a and 5b are designed to receive suitable shackles or U-bolts 10 for securing them to the vehicle springs; and the seats are thickened in the center to be rockably mounted on cross-pins 8a and 8b, respectively, these being carried by the side walls of receptacles 6a and 6b, and such side walls receiving the thickened portions of the spring seats between them.

The assembly of the spring seat 5a, receptacle 6a and bearing 7a is more clearly shown in Fig. 4. It is seen in this figure that a bolt 25, freely centered in the receptacle is threaded into the stock of the bearing. The head of the bolt seats on an annular shoulder 26 in the receptacle, enabling the latter to turn about the bolt while held down by the same on the bearing. The latter has a track 27, and the receptacle a hub 28, these elements combining to form a race for an intermediate series of rollers 22. The receptacle is chambered at 29 to receive the track 27.

The corner bearing 1a is mounted over a set of blocks 2a and 3a applied respectively from above and below to the axle 9a, bolts 30 serving to join the blocks in firm engagement with the axle. The bearing 1a is assembled with the block 2a in identically the same manner as the receptacle 6a is assembled with the bearing 7a, that is, with duplicates of the bolt 25, shoulder 26, track 27 and hub 28, these reference numerals being applied to Fig. 2. The bearing 1a is thus rotatable on a vertical pivot relative to the axle 9a while being retained to the same. It may now be said that the bottom assemblies of the bearings 1b, 1c and 1d are constituted identically with that of the bearing 1a, just described.

A longitudinal tie connection occurs in the center of the frame formed by the beams 4a and 4b, and the axles 9a and 9b. Thus, Fig. 3 shows more clearly that the axles receive clips 10a and 10b on the inner side, the outer ends of the clips being fluted—as shown at 10c—to seat the respective axles, and these being rigidly secured by welding or other suitable means to the clips. The inner portions of the latter are horizontally bifurcated to receive outer head portions 11a and 12a of a rod 11 and a tube 12, respectively, the rod being telescoped to a partial extent in the tube. A coil spring 17 is mounted on the rod between the tube and the head portion 11a; and a coil spring 18 is lodged between the rod and the head portion 12a. Under normal conditions the springs 17 and 18 are designed to be under compression. The head portions are vertically bored at 12b for the free passage of pins 13a and 13b, these being lodged in the arms of the related clips to dispose the rod and tube assembly pivotally in relation to the axles 9a and 9b.

Diagonal tie means are also provided between the corners of the unit. Thus, the bearings 1a, 1b, 1c and 1d carry hooks 19 from which a diagonal cluster of chains 20 extends to a central point above the rod and tube assembly 11—12. Here the chains are linked to a ring 21. The connection of the chains to the hooks is shown plain, but shackles or other suitable means may be employed to attach the chains to the hooks.

It is now apparent that the unit is constituted to react in a number of respects to strains and road conditions imposed on the vehicle. It is first evident that forth and back impact shocks received by the axles are cushioned by the coil springs to the front or rear thereof. In case only one wheel of the vehicle receives such a shock, the corresponding end of its axle will react as stated while the opposite end of such axle will pivot in the related bearing to relieve the unit of strain. Further, should the wheels at one side of the vehicle gather while on the inner side of a curve, the inner bearings—such as 1a and 1b—will gather, compressing the springs 15a and 15b between them, this action allowing the outer springs 16a and 16b to relax. The slight gather of the axles 9a and 9b in the region of the springs referred to will be made possible by the pivotal suspension of the axles from the bearings 1a, 1b, 1c and 1d. In case the aforesaid action of the axles has a tendency to gather the beams 4a and 4b to a slight extent, the vehicle leaf springs will flex slightly to permit such gather. Also, the gathering of the axles at any point will impose a slight amount of compression on the central springs 17 and 18 while the pivots at 13a and 13b relieve the parts 11 and 12 of lateral strain, but the tendency of the springs 17 and 18 and the lateral springs 15a, 15b, 15c and 15d to over-expand will be resisted by the tie chains 20, which also have an equalizing effect on the axles. The unit is also responsive to lateral road shocks. Thus, in case the beam 4a falls, the unit will pivot on the beam 4b; and in case only one wheel carried by this beam falls, the beam will pivot on the spring seat at 8a to allow the wheel to fall without strain to the balance of the unit. It is thus apparent that the novel tandem rear-end unit is responsive and self-adjusting to shocks from all directions, making it a universal unit to all intents and purposes. Yet, the unit is composed of a balanced assembly of simple and sturdy parts which are constructed plainly and may therefore be produced economically and designed for efficient operation.

I claim:

1. A tandem axle unit for vehicles carrying supporting springs, comprising a pair of axles, side beam structures carried by the same, seats for the vehicle springs comprising a three-way universal saddle including, bearings slidably carried by the side beam structures and universally supporting said seats.

2. A tandem axle unit for vehicles carrying a pair of laterally-spaced supporting springs, comprising a pair of axles, side beam structures carried by the same below the vehicle springs, seats for the latter comprising three-way universal saddles including, bearings slidably carried by the side beam structures and supporting said seats for universal rockable motion.

3. A tandem axle unit for vehicles carrying a pair of laterally-spaced supporting springs, comprising a pair of axles, side beam structures carried by the same below the vehicle springs, seats for the latter comprising three-way universal saddles including, bearings slidably carried by the side beam structures, and transverse pivots between the bearings and said seats connecting the latter for universal rockable motion.

4. A tandem axle unit for vehicles carrying a laterally-spaced pair of supporting springs, comprising a pair of axles, fore and aft universal bearings carried by the end portions thereof, a longitudinal beam slidably disposed in the bearings of each side, an intermediate bearing slidable on each beam, and a universally mounted saddle connection between each intermediate bearing and the correspondingly-located vehicle supporting spring.

5. The structure of claim 4, and yieldable means between the intermediate bearing and the fore and aft bearings.

6. The structure of claim 4, the beams projecting beyond the fore and aft bearings, abutments carried by the ends of the beams, and yieldable means between the abutments and the correspondingly-positioned bearings.

7. The structure of claim 4, and springs coiled around the beams between the intermediate bearing and the fore and aft bearings.

8. The structure of claim 4, the beams projecting beyond the fore and aft bearings, abutments carried by the ends of the beams, and springs coiled around the latter between the abutments and the correspondingly-positioned bearings.

9. The structure of claim 4, said beams being of circular cross-section and rotatable in the bearings.

10. A tandem axle unit for vehicles carrying a laterally-spaced pair of supporting springs, comprising a pair of axles, fore and aft bearings located over the end portions thereof, side beams carried by the bearings, an intermediate bearing carried by each beam and slidably mounted thereon, a universal connection between each intermediate bearing and the correspondingly-located vehicle supporting spring, corner supports carried by the axles under the correspondingly-located bearings, and vertical pivot connections between the fore and aft bearings and the corner supports.

11. The structure of claim 4, and springs coiled around the beams between the intermediate bearing and the fore and aft bearings, abutments carried by the ends of the beams, and springs coiled around the beams between the abutments and the correspondingly-located bearings, all the springs being under compression when the bearings are normally positioned.

12. The structure of claim 4, yieldable means exerting a separating influence on the axles, and positive tie means between the fore and aft bearings and limiting the separation of the axles.

13. The structure of claim 4, and a cluster of diagonal chains between the fore and aft bearings.

14. The structure of claim 4, clips carried at intermediate points by the axles, tie means between the clips, and terminal pivot connections between the tie means and the respective clips.

15. The structure of claim 4, clips carried at intermediate points by the axles, tie means between the clips, and terminal pivot connections between the tie means and the respective clips, said tie means being inwardly yieldable.

16. The structure of claim 4, clips carried at intermediate points by the axles, tie means between the clips, and terminal pivot connections between the tie means and the respective clips, said tie means comprising a tube with a rod telescoped in the same, and spring means acting to separate the rod from the tube.

17. The structure of claim 4, clips carried at intermediate points by the axles, tie means between the clips, and terminal pivot connections between the tie means and the respective clips, said tie means comprising a tube with a headpiece linked to one of said pivot connections, a rod telescoped in the tube and having a headpiece linked to the other pivot connection, a spring between the tube headpiece and the inner end of the rod, and a spring coiled around the rod between its headpiece and the inner end of the tube.

18. The structure of claim 4, clips carried at intermediate points by the axles, tie means between the clips, and terminal pivot connections between the tie means and the respective clips, said tie means comprising a tube with a headpiece linked to one of said pivot connections, a rod telescoped in the tube and having a headpiece linked to the other pivot connection, a spring between the tube headpiece and the inner end of the rod, and a spring coiled around the rod between its headpiece and the inner end of the tube, the springs being normally under compression.

JOHN JUNGWIRTH.

REFERENCES CITED

The following references are of record in the file of this patent:

UNITED STATES PATENTS

| Number | Name | Date |
| --- | --- | --- |
| 1,690,247 | Reid | Nov. 6, 1928 |
| 1,936,954 | Robin | Nov. 28, 1933 |
| 2,227,448 | Freeman | Jan. 7, 1941 |
| 2,343,872 | Low | Mar. 14, 1944 |
| 2,456,719 | Martin | Dec. 21, 1948 |

FOREIGN PATENTS

| Number | Country | Date |
| --- | --- | --- |
| 372,730 | Great Britain | Nov. 4, 1930 |